(12) United States Patent
Swamy

(10) Patent No.: US 9,154,048 B2
(45) Date of Patent: Oct. 6, 2015

(54) BALANCED FLUX ISOLATION TRANSFORMER BASED EIGHTEEN PULSE RECTIFICATION SCHEME FOR USE WITH VARIABLE FREQUENCY DRIVES

(71) Applicant: Yaskawa America, Inc., Waukegan, IL (US)

(72) Inventor: Mahesh M. Swamy, Gurnee, IL (US)

(73) Assignee: Yaskawa America, Inc., Waukegan, IL (US)

( * ) Notice: Subject to any disclaimer, the term of this patent is extended or adjusted under 35 U.S.C. 154(b) by 217 days.

(21) Appl. No.: 13/868,227

(22) Filed: Apr. 23, 2013

(65) Prior Publication Data

US 2014/0313800 A1 Oct. 23, 2014

(51) Int. Cl.
*H02M 3/335* (2006.01)
*H02M 7/08* (2006.01)

(52) U.S. Cl.
CPC ........................................ *H02M 7/08* (2013.01)

(58) Field of Classification Search
CPC .... H01F 2019/085; H02M 7/08; H02M 7/068
USPC ........ 363/65, 125, 126, 17, 37; 336/200, 234, 336/216, 217
See application file for complete search history.

(56) References Cited

U.S. PATENT DOCUMENTS

| | | | |
|---|---|---|---|
| 4,876,634 A | 10/1989 | Paice | |
| 5,124,904 A | 6/1992 | Paice | |
| 5,130,628 A * | 7/1992 | Owen | 318/780 |
| 5,455,759 A | 10/1995 | Paice | |
| 5,619,407 A | 4/1997 | Hammond | |
| 6,525,951 B1 | 2/2003 | Paice | |
| 6,650,557 B2 * | 11/2003 | Ferens et al. | 363/126 |
| 6,861,936 B2 * | 3/2005 | Kamath | 336/148 |
| 7,609,536 B2 * | 10/2009 | Brochu et al. | 363/69 |
| 7,750,782 B1 * | 7/2010 | Paice | 336/12 |
| 2008/0165553 A1 * | 7/2008 | Swamy | 363/67 |

\* cited by examiner

*Primary Examiner* — Rajnikant Patel
(74) *Attorney, Agent, or Firm* — Wood, Phillips, Katz, Clark & Mortimer

(57) ABSTRACT

An AC/DC converter system comprises an input circuit for connection to a three-phase AC source. An isolation transformer comprises a symmetrical core with a set of primary windings and first and second sets of secondary windings wound on the symmetrical core providing balanced flux in all three phases and magnetically coupling to the set of primary windings. The first and second sets of secondary windings are phase shifted by select amounts from the set of primary windings. The set of primary windings is connected to the input circuit. An AC/DC converter comprises first, second and third three-phase rectifiers, the first three-phase rectifier is powered by the first set of secondary windings, the second three-phase rectifier is powered by the second set of secondary windings, and the third three-phase rectifier is powered by the input circuit. An output circuit is connected between the AC/DC converter and a DC load.

20 Claims, 10 Drawing Sheets

BALANCED FLUX ISOLATION TRANSFORMER BASED EIGHTEEN PULSE RECTIFICATION SCHEME FOR USE WITH VARIABLE FREQUENCY DRIVES

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

The present invention relates to an AC/DC converter system and, more particularly, to an eighteen pulse rectifier using a three-phase isolation transformer having balanced flux in all the three phases.

BACKGROUND

Variable Frequency Drive (VFD) systems with diode rectifier front ends draw discontinuous current from the power system to which they are connected. This results in current harmonic distortion, which eventually translates into voltage distortion. Typically, the power system is robust and can handle significant amount of current distortion without showing signs of voltage distortion. However, in cases where the majority of the load on a distribution feeder is made up of VFDs with rectifier front ends, the current distortion becomes an important issue. When such non linear load is not distributed equally among the phases of a three-phase AC system, there is imbalance in the harmonic current flowing in each phase. Imbalanced current-flow in the AC system results in imbalanced voltage drop across the various power delivery equipment. The result is an imbalanced voltage across the phases. In a wye connected system with its neutral grounded to the power system ground, this imbalanced voltage causes zero sequence currents to flow into the earth ground. Current flow is always associated with power loss due to resistive component in the neutral connection. Consequently, unbalanced current in the phases of a three-phase AC system creates neutral current, which in turn causes losses in the neutral conductors that often run hot. In addition, the ground current can corrode or hasten corrosion of the large number of underground conduits used in industrial plants to carry many different things important to various industrial processes.

Traditional three-phase power transformers are constructed using strip Si based steel, often called transformer steel. Depending on the application, some are grain oriented Si steel and others are non grain oriented Si steel. In all cases, the basic construction constitutes forming two E shaped thin laminations that are placed on top of each other. The resulting structure yields two windows where three distinct coils capable of carrying current are placed. With this structure, the flux path of the flux produced by the current flowing in the middle coil is different from the flux path of the flux produced by the end coils. This inherent imbalance in the flux paths adds to the already existing voltage imbalance in the AC system due to the reasons discussed earlier. In other words, use of such transformers in the presence of a highly non linear load environment can create more current distortion and lead to more loss in the AC power system. One solution to this problem is to employ three single-phase power transformers. However, the overall cost and the overall size for housing the three single-phase power transformers is always much higher than a traditional single three-phase transformers. Hence, the use of three single-phase AC transformers to achieve a balanced three-phase AC source is rare.

Use of stripped laminations for constructing transformers is also associated with higher power loss since the flux travelling on one lamination needs to jump to the other lamination to continue its closed loop path. Since the flux has to cross a thin air barrier, this results in power loss across this type of distributed and unintentional air gaps found throughout the structure.

Grid-connected transformers run hotter under harmonic loading. Harmonics can have a detrimental effect on emergency generators, telephones and other electrical equipment. When reactive power compensation (in the form of passive power factor improving capacitors) is used with non-linear loads, resonance conditions can occur that may result in even higher levels of harmonic voltage and current distortion thereby causing equipment failure and disruption of power service.

There are many ways of reducing the total current harmonic distortion (THD) caused by VFDs. Multi-pulse techniques are popular because they do not interfere with the existing power system from resonance point of view and they are robust and perform well.

Harmonic distortion concerns are serious when the power ratings of the VFD load increases. Large power VFDs are gaining in popularity due to their low cost and impressive reliability. Use of large power VFDs increases the amplitude of low order harmonics that can significantly impact the power system. In many large power installations, current harmonic distortion levels achievable using twelve-pulse techniques are insufficient to meet the levels recommended in IEEE Standard 519-1992. As a result eighteen-pulse VFD systems are proposed to achieve superior harmonic performance compared to the traditional twelve-pulse systems.

A typical three-phase full bridge rectifier is said to be a six-pulse rectifier because there are six distinct diode pair conduction intervals in one complete electrical cycle. In such a six-pulse rectifier with no DC bus capacitor, the characteristic harmonics are non-triplen odd harmonics (e.g., 5th, 7th, 11th, etc.). In general, the characteristic harmonics generated by a semiconductor rectifier is given by:

$$h = kq \pm 1 \tag{1}$$

where h is the order of harmonics; k is any integer, and q is the pulse number of the rectifier (6 for a six-pulse rectifier). The per unit value of the characteristic harmonics present in the theoretical current waveform at the input of the semiconductor converter is given by $1/h$. In practice, the observed per unit value of the harmonics is much greater than $1/h$. From these observations, it is clear that increasing the pulse number from six to either twelve or eighteen will significantly reduce the amplitude of low order harmonics and hence the total current harmonic distortion.

The eighteen-pulse systems have become economically feasible due to the recent advances in autotransformer techniques that help reduce the overall size and cost and achieve low total current harmonic distortion. When employing autotransformers, care should be taken to force the different rectifier units to properly share the current. The eighteen-pulse configuration lends itself better in achieving this goal compared to the twelve-pulse scheme.

For eighteen-pulse operation, there is a need for three sets of three-phase AC supply that are phase shifted with respect to each other by twenty electrical degrees. Typically, this is achieved using a four winding isolation transformer that has one set of primary windings and three sets of secondary windings. One set of secondary winding is in phase with the primary winding, while the other two sets are phase shifted by +20 electrical degrees and −20 electrical degrees, respectively, with the primary. This arrangement yields three phase-shifted supplies that allow eighteen-pulse operation. The use of a DC link choke is optional. The leakage inductance of the transformer may be sufficient to smooth the input current and improve the overall current harmonic distortion levels. One disadvantage of this scheme is that the phase-shifting isolation transformer is bulky and expensive.

Instead of using ±20 degree phase-shifted outputs from an isolation transformer for eighteen-pulse operation, a nine-phase supply can be used, where each phase lags the other by 40 electrical degrees. U.S. Pat. No. 5,455,759 shows a nine-phase AC supply using a wye-fork with a tertiary delta winding to circulate triplen harmonics.

Though the size of the autotransformer is much smaller than an equivalent isolation transformer, most autotransformer schemes require the use of additional series impedance to smooth the input AC current. The rating of the transformer is about 60% of the rating of the load. The rectified output voltage from a balanced nine-phase output is about 1.14 times higher (14% higher) than that obtained from a three-phase six-pulse AC to DC rectifier as noted in U.S. Pat. No. 5,124,904. This requires modifying the basic three-phase to nine-phase converter using more windings and alternate paths to provide the needed step down action necessary to use the resulting topology on an existing three-phase AC to DC rectifier system.

Many topological modifications including the ones in U.S. Pat. Nos. 5,124,904, 5,455,759, 5,619,407, 6,525,951 B1, etc have been employed to overcome the higher rectified voltage issue. However, the extra stub and teaser windings add cost and complexity to the structure.

U.S. Pat. No. 5,124,904 shows a nine-phase AC supply using a delta-fork that does not require any additional delta winding. In this configuration, the average DC output voltage is about 14% higher than that obtained using a standard six-pulse rectifier scheme. This can potentially stress the DC bus capacitors and the IGBTs in the inverter section of a VFD. In order to overcome this, additional teaser windings are used. These windings not only add cost and increase the overall rating of the transformer, but also cause imbalance that results in higher than normal circulating currents in the delta windings, which need to be accommodated. The harmonic performance is good but the overall size is large with rated current flow through the teaser windings.

In order to overcome the 14% higher average DC bus voltage observed in the previous configuration, a modification of the configuration was proposed in the U.S. Pat. No. 5,619,407. The harmonic performance is similar and the average DC bus voltage is equal to that observed in six-pulse rectifiers. Similar to the previous configuration, the stub winding currents are high and the teaser winding needs to carry rated load current making the overall transformer big in size and expensive to wind.

In autotransformer configurations using stub and/or teaser windings, discussed above, the overall size and rating of the autotransformer is higher than the optimal value. Use of stub windings typically results in poor utilization of the core and involves more labor to wind the coils. A polygon type of autotransformer is better than stub type autotransformer from size and core utilization points of view. A polygon type autotransformer is shown in U.S. Pat. No. 4,876,634. This configuration requires the use of inter-phase transformers and input AC inductors to achieve low total current harmonic distortion. The reason is that the outputs are not equally spaced to achieve a nine-phase AC supply as in the previous configurations. The polygon autotransformer provides +/−20° phase shifted outputs to achieve eighteen-pulse operation.

A popular eighteen-pulse autotransformer configuration is shown in U.S. Pat. No. 6,525,951. This configuration is a modified version of the configuration shown in the '759 patent. A delta-connected tertiary winding is included in the wye fork. This construction is called a windmill construction. Initially, the windmill structure was present in each phase and the size of the transformer was still large. The kVA rating was about 60%. By removing the windmill structure from two of the three phases, it was shown that the performance remained equally good. By adopting the modified structure of the '759 patent, the kVA rating of the autotransformer was reduced from 60% to 55%.

In the eighteen-pulse autotransformer systems, the change of current from one conducting diode pair to the other is quite sudden and occurs every forty electrical degrees. The situation is amplified since most autotransformers do not have enough leakage inductance to slow the transition resulting in high di/dt across the rectifier diodes. Though the RMS current rating may not exceed the current rating of the diode, attention should be given to the di/dt of the current through the diodes. It is believed that standard rectifier grade diodes are vulnerable to premature failure.

Some important drawbacks of the topologies discussed in the prior art are that autotransformer based topologies require significant input impedance to smooth the current and reduce the overall input current distortion. Autotransformer techniques utilize complex winding structures, either of the stub-type or the polygon type. These transformers are labor intensive to manufacture and result in poor core utilization. Because of complicated winding structure and the fact that partial turns are not practically feasible to build, the error resulting in rounding off can be significant that influences the final performance. This is one reason why input impedance of significant value is needed to account for such aberrations. Also, the change of current from one conducting diode pair to the other is quite sudden in all autotransformer configurations. This causes higher than normal di/dt stress in rectifier diodes and should be considered while designing systems required to have high reliability. All transformers used are constructed using traditional strip steel based box type construction to house three phase windings. As described earlier, such structures cause more imbalance and require additional inductors to suppress the undesirable effects of such imbalance. The additional passive components occupy space and increase the overall cost of the harmonic mitigation technique.

The present invention is directed to solving one or more of the problems discussed above in a novel and simple manner.

SUMMARY

The present invention is directed to an AC/DC converter system and, more particularly, to an eighteen-pulse rectifier using an isolation transformer with two sets of secondary windings. The isolation transformer may be constructed using a symmetrical construction to yield balanced flux paths.

In accordance with one aspect of the invention there is described an AC/DC converter system comprising an input circuit for connection to a three-phase AC source. An isolation transformer comprises a symmetrical core with a set of primary windings and first and second sets of secondary windings wound on the symmetrical core providing balanced flux in all three phases and magnetically coupling to the set of primary windings. The first and second sets of secondary windings are phase shifted by select amounts from the set of primary windings. The set of primary windings is connected to the input circuit. An AC/DC converter comprises first, second and third three-phase rectifiers, the first three-phase rectifier being powered by the first set of secondary windings, the second three-phase rectifier being powered by the second set of secondary windings, and the third three-phase rectifier being powered by the input circuit. An output circuit is connected between the AC/DC converter and a DC load.

It is a feature of the invention that the symmetrical core comprises three sections, each section having a coil of steel, and the three sections are arranged in a triangular configuration defining three limbs for carrying the set of primary windings and first and second sets of secondary windings. Each section may have three coils of steel slightly offset relative to one another. The three limbs may have a hexagonal cross section.

The first and second sets of secondary windings may be phase shifted by equal and opposite amounts from the set of primary windings.

The first and second sets of secondary windings may be phase shifted by +20 electrical degrees and −20 electrical degrees, respectively, from the set of primary windings.

Each of the three-phase rectifiers may comprise six-pulse rectifiers. The input circuit may comprise a three-phase inductor and an impedance matching three-phase inductor electrically connected between the input circuit and the third three-phase rectifier.

The output circuit may comprise parallel connected DC outputs from the bridge rectifiers connected through an output inductor to the DC load.

It is a feature of the invention that the set of primary windings can be either delta wound or wye wound as long as the phase difference between the primary winding and the two sets of secondary windings are +20 degrees and −20 degrees, respectively.

It is another feature of the invention that each set of secondary windings comprises polygon wound main secondary windings.

There is disclosed in accordance with another aspect of the invention a converter system comprising an input circuit for connection to a three-phase AC source. A symmetrical core isolation transformer comprises primary windings and first and second sets of secondary windings magnetically coupled to the set of primary windings. The first and second sets of secondary windings are level translated to a higher voltage by an amount in the range of about −2% to +2% from the set of primary windings using independent tabs in the secondary windings. An eighteen-pulse rectifier comprises first, second and third six-pulse rectifiers, the first six-pulse rectifier being powered by the first set of secondary windings, the second six-pulse rectifier being powered by the second set of secondary windings, and the third six-pulse rectifier being powered by the input circuit. An output circuit is connected between the AC/DC converter and a DC load.

There is disclosed in accordance with a further aspect of the invention an AC/DC converter system comprising an input circuit comprising a three-phase inductor for connection to a three-phase AC source. A symmetrical core isolation transformer comprises primary windings and first and second sets of secondary windings magnetically coupled to the set of primary windings. The first and second sets of secondary windings are level translated to a higher voltage by an amount of about 2% from the set of primary windings by providing taps located at about negative 2% in the primary winding. An AC/DC converter comprises first, second and third three-phase rectifiers each for converting AC power to DC power. The first three-phase rectifier is electrically connected to the first set of secondary windings. The second three-phase rectifier is electrically connected to the second set of secondary windings. An inductor is electrically connected between a primary winding tap of about +2% and the third three-phase rectifier comprising a current balancing three-phase inductor matched to the windings of the isolation transformer to balance amplitude of current flow into the first, second and third three-phase rectifiers. An output circuit is connected between the AC/DC converter and a DC load.

Other features and advantages will be apparent from a review of the entire specification, including the appended claims and drawings.

DETAILED DESCRIPTION

As described more particularly below, an AC/DC converter system with an eighteen-pulse rectifier uses a three phase isolation transformer having balanced flux in all three phases with two sets of secondary windings. In an exemplary embodiment the isolation transformer comprises a symmetrical core transformer.

The symmetrical core transformer structure is made from continuously wound thin steel laminations thereby avoiding the problem of power loss due to distributed air gap in traditional transformer structures. A typical symmetrical core transformer construction with its hexagonal cross section is described below. The flux path is also optimal and the windings are symmetrically distributed thereby enabling better heat distribution and higher efficiency of operation. Such a balanced structure is optimal to achieve the goal of harmonic reduction on a system level basis.

In the illustrated AC/DC converter system, an isolation transformer uses only two sets of secondary windings, reducing size and cost. An eighteen-pulse rectifier uses one six-pulse rectifier circuit directly connected to the AC source via balancing inductance to match the inductance in front of the other two sets of six-pulse rectifier circuits to achieve eighteen-pulse operation. The resulting scheme has two six-pulse rectifiers powered via a phase-shifting isolation transformer, while the third six-pulse rectifier is fed directly from the AC source via a matching-impedance.

Figure 1:
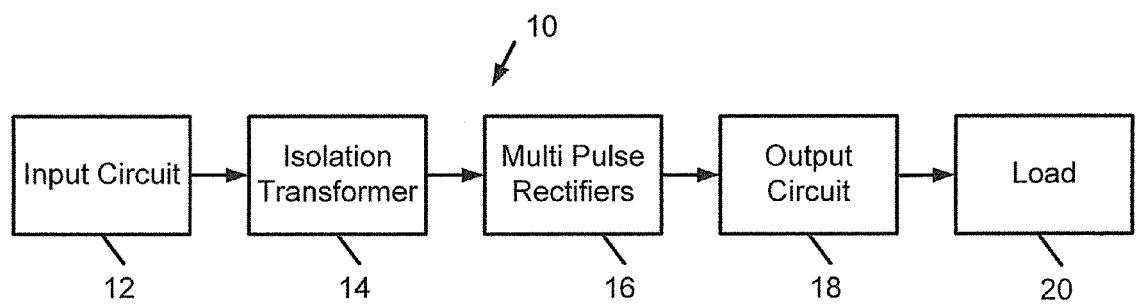
FIG. 1 is a block diagram of an AC/DC converter system in accordance with the invention.
Figure 2:
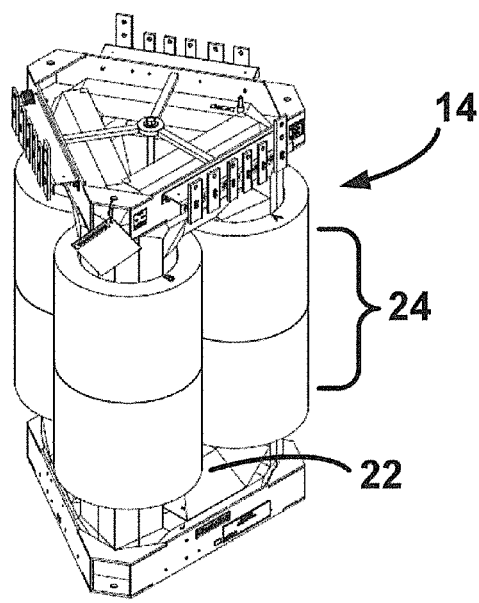
FIG. 2 is a perspective view of a symmetrical core isolation transformer used with the AC/DC converter system of FIG. 1.
Figure 3A:
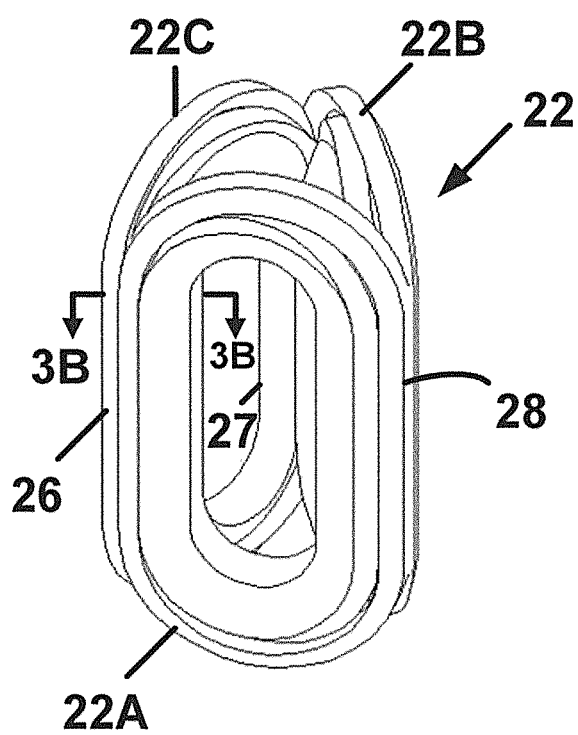
FIG. 3A is a perspective view of a core of the isolation transformer of FIG. 2.
Figure 3B:
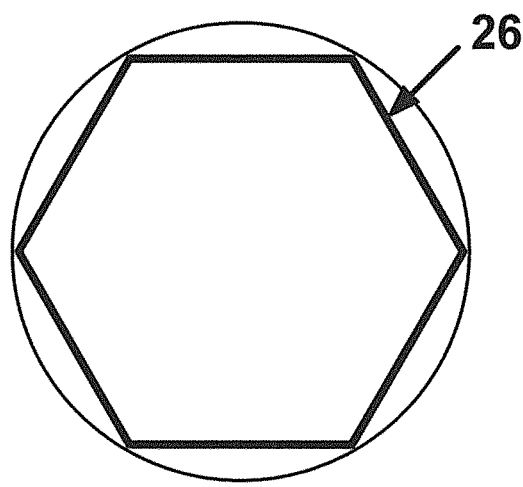
FIG. 3B is a cross section of the limbs of the core of FIG. 3A.

Referring initially to FIG. 1, an AC/DC converter system 10 is illustrated in block diagram form and comprises an input circuit 12, an isolation transformer 14, a rectifier circuit 16, an output circuit 18 and a load 20. The input circuit 12 comprises a three phase AC supply. The rectifier circuit 16 comprises an eighteen-pulse rectifier circuit, see FIG. 4. The isolation transformer 14 comprises a three phase transformer having a core 22 and windings 24 wound thereon, see FIG. 2. The core 22 is illustrated in FIG. 3A and comprises a symmetrical core. The core 22 comprises three sections 22A, 22B and 22C. Each section 22A-22B comprises three coils of steel slightly offset relative to one another. These sections 22A-22B are arranged in a triangular configuration as shown in FIG. 3A and they form three limbs 26, 27 and 28 for carrying the windings 24. The three limbs 26-28 each have a hexagonal cross section as shown for the limb 26 in FIG. 3B. More generally, the isolation transformer 14 has balanced flux in all three phases. Such an isolation transformer 14 is well known and was originally developed by Siemens in 1891. In 1999, Hexaformer AB developed an economical way of manufacturing such an isolation transformer.

Figure 4:
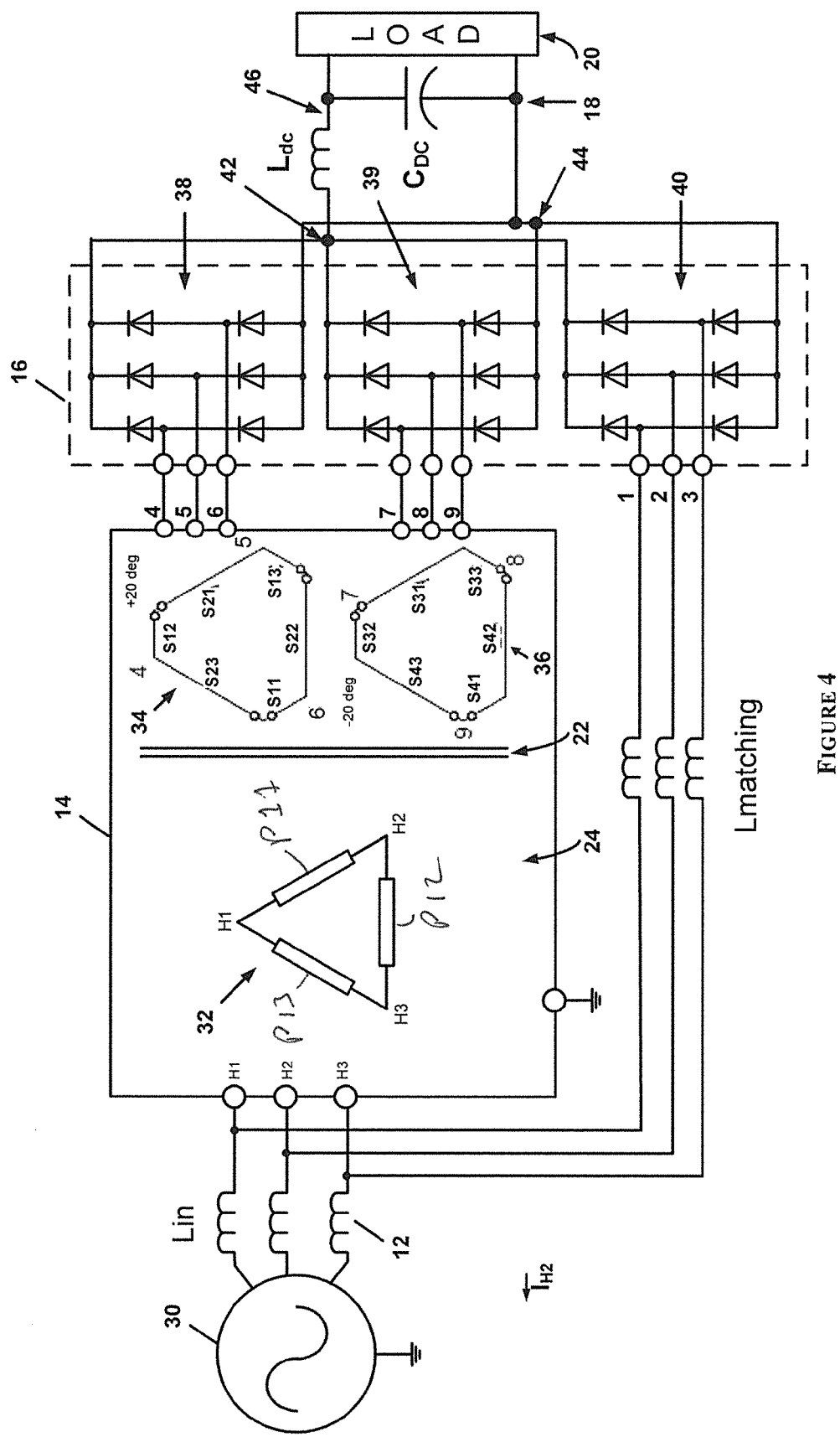
FIG. 4 is a schematic representation of an eighteen-pulse converter circuit fed from a phase shifted isolation transformer in accordance with the invention.

Referring to FIG. 4, an electrical schematic illustrates one embodiment of the AC/DC converter system 10 shown in block diagram form in FIG. 1. The input circuit 12 comprises a three phase inductor $L_{IN}$ connected via terminals A, B and C to a three-phase AC source 30. The isolation transformer 14 comprises the core 22 and the windings 24 including main primary windings 32 configured in a delta manner and first and second sets 34 and 36 of secondary polygon windings magnetically coupled via the core 22 to the set of primary windings 32. The first and second sets 34 and 36 of secondary windings are phase shifted by select amounts from the set of primary windings 32. The first and second sets 34 and 36 of secondary windings are phase shifted by +20 electrical degrees and −20 electrical degrees, respectively, from the resultant vector formed by three-phase primary windings 32, connected in a delta manner, as in the illustrated embodiment of the invention. The primary winding 32 is connected to the input circuit inductor $L_{IN}$.

The eighteen-pulse rectifier 16 comprises first, second and third conventional three-phase rectifiers 38, 39 and 40, respectively, each for converting AC power to DC power, as is well known. Each three-phase rectifier 38-40 comprises a full bridge and is said to be a six-pulse rectifier because there are six distinct diode pair conduction intervals in one complete electrical cycle, as is conventional. The first three-phase rectifier 38 is electrically connected to the first set 34 of secondary windings via nodes 4, 5 and 6. The second three phase rectifier 39 is electrically connected to the second set 36 of secondary windings via nodes 7, 8 and 9. An impedance matching inductor $L_{matching}$ is electrically connected between the input inductor $L_{IN}$ and the third three phase rectifier 40 via nodes 1, 2 and 3.

The phase-shifting transformer 14 feeds two of the three rectifiers 38 and 39 and is sized to handle ⅔rd the rated power. Similarly, the matching inductor $L_{matching}$ is sized to carry only ⅓rd the rated current. This arrangement results in the overall size of the transformer and matching inductor combination to be smaller and less expensive than conventional four winding arrangements.

The output circuit 18 connects the DC outputs of the three-phase rectifiers 38-40 in parallel between nodes 42 and 44 to define a DC bus 46. An output inductor $L_{dc}$ is connected between the node 42 and the DC load 20. A DC bus capacitor $C_{DC}$ is connected across the DC bus 46. The AC/DC converter system 10 is particularly adapted for use with a DC load 20 in the form of a variable frequency drive. Such a drive typically includes an inverter for converting the DC power on the DC bus 46 to AC power for operating the drive at a select frequency. However, the system 10 can be used with other conventional DC loads.

In the illustrated embodiment of the invention, each set of secondary windings 34 and 36 comprises polygon wound main secondary windings. The secondary windings may be polygon based to achieve symmetry and ease of manufacturability. The phase shift in the isolation transformer 14 is achieved by using polygon wound secondary windings on appropriate limbs of the transformer core 22. Polygon windings achieve better symmetry and improve manufacturability. Further, the current flowing in the polygon windings are lower than that flowing in wye connected secondary windings with teaser windings to provide the necessary phase shift. This results in lower power loss in the secondary windings even though the number of turns in the secondary polygon is higher than that in the corresponding wye connected secondary with teaser windings to maintain the same mmf. By using opposite ends of the polygon arm of a particular phase, the desired phase shifted outputs are easily attainable. The secondary windings could also be constructed using traditional teaser windings, where the three main secondary windings are in phase with corresponding ones of the main primary windings, and are electrically connected to three teaser secondary windings, each in phase with adjacent ones of the three main primary windings, resulting in a vector phase shifted from the phase of the corresponding one of the three main primary windings.

The primary windings are denoted by the letter P and the secondary sets of windings are denoted by the letter S. There are three limbs 26-28 on the transformer core 22 and they are numbered 1, 2, and 3, respectively. There is one set of primary windings. The nomenclature is as follows: P11 denotes the primary winding wound on limb 1 (the first limb 26). Similarly, P12 and P13 denote the primary winding wound on limbs 2 (the second limb 27) and 3 (the third limb 28) of the transformer core 22, respectively.

The same logic as adopted for the primary windings is adopted for the secondary windings. S11, S12, S13 denotes the first set of secondary windings on limbs 1, 2, and 3, respectively. S21, S22, S23 denotes the second set of secondary windings on limbs 1, 2, and 3, respectively. The first two sets of secondary windings correspond to the set numbered 34.

S31, S32, S33 denotes the third set of secondary windings on limbs 1, 2, and 3, respectively. S41, S42, S43 denotes the fourth set of secondary windings on limbs 1, 2, and 3, respectively. The third and fourth sets of secondary windings correspond to the set numbered 36.

The first set 34 of secondary windings includes main windings S11, S12, S13, S21, S22 and S23. The windings P11, S11, and S21 are on the first limb 26 of core 22 and so are in phase with each other. Similarly, the windings P12, S12, and S22 are in phase to each other since they are all on the second limb 27 of the core 22. Finally, the windings P13, S13, and S23 are in phase to each other since they are all on the third limb 28 of the core 22. The first set 34 of the secondary windings is a polygon connected winding, which is formed by connecting the end of S12 to start of S21; end of S21 to start of S13; end of S13 to start of S22; end of S22 to start of S11; end of S11 to start of S23; and finally closing the polygon with the end of S23 connected to the start of S12.

The second set 36 of secondary windings includes main windings S31, S32, S33, S41, S42 and S43. The windings P11, S31, and S41 are on the first limb 26 of the core 22 and so are in phase to each other. Similarly, the windings P12, S32, and S42 are in phase to each other since they are all on the second limb 27 of the core 22. Finally, the windings P13, S33, and S43 are in phase to each other since they are all on the third limb 28 of the core 22. The second set 36 of the secondary is also a polygon connected winding, which is formed by connecting end of S32 to start of S41; end of S41 to start of S33; end of S33 to start of S42; end of S42 to start of S31; end of S31 to start of S43; and finally closing the polygon with the end of S43 connected to the start of S32.

As shown in the illustrated embodiment, the secondary polygon windings are exactly symmetrical and hence are easy to manufacture. Terminals marked 4, 5, 6 and 7, 8, 9 are at opposite ends of the polygon wound sets of secondary windings 34 and 36, respectively. The phase difference between the set of 4, 5, 6 windings and the set of 7, 8, 9 windings is 40 electrical degrees.

In order to estimate the total current harmonic distortion in the input line current $I_{in}$, various assumptions are made. The inductance in the DC bus 46 is large enough to assume that the DC bus current has no ripple. The leakage inductance of the isolation transformer 14 is neglected so that the current through the windings is assumed to be rectangular in shape. The harmonic analysis is carried out at rated load current, $I_{dc}$. The windings of the isolation transformer 14 and the matching inductance $L_{matching}$ are well balanced such that the load current, $I_{dc}$ is equally shared among the three different paths. In other words, the height of the rectangular current pattern in each of the parallel paths is $I_{dc}/3$. The primary windings marked as P11, P12, and P13, have N1 turns.

In order to determine the contribution of secondary currents in the primary side input current, it is important to determine the turns ratio among N1, N2, and N3. This is achieved using the expanded vector diagram shown in FIG. 5.

From FIG. 5, the turns ratio in terms of per unit value is computed as follows:

$$\frac{\sqrt{3}}{\sin(120)} = \frac{N_2}{\sin(40)} \quad (2)$$
$$= \frac{N_3}{\sin(20)}$$

$$N_2 = 2 \cdot \sin(40)$$
$$= 1.2855$$

$$N_3 = 2 \cdot \sin(20)$$
$$= 0.684$$

Figure 5:
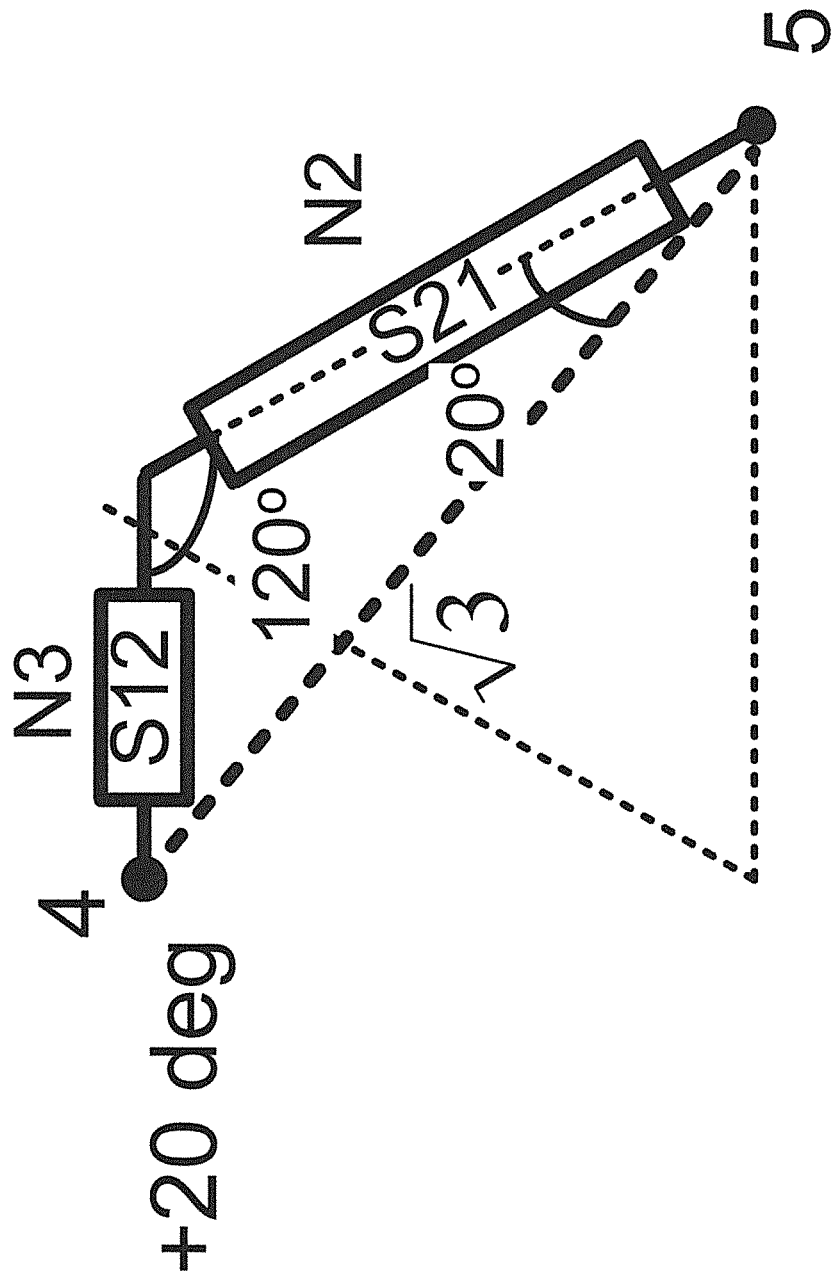
FIG. 5 is a vector representation of one of the sets of secondary windings in the isolation transformer of FIG. 4.

From equation (2) and FIG. 5, the components that make up the primary current $I_{H2}$ are derived next.

$$I_{H2} = I'_4 + I'_7 + I''_6 + I''_8 \quad (3)$$

$$I'_4 = \frac{1.2855}{\sqrt{3}} \cdot \frac{I_{dc}}{3} \angle 20°$$

$$I'_7 = \frac{1.2855}{\sqrt{3}} \cdot \frac{I_{dc}}{3} \angle -20°$$

$$I''_6 = \frac{0.6848}{\sqrt{3}} \cdot \frac{I_{dc}}{3} \angle 140°$$

$$I''_8 = \frac{0.6848}{\sqrt{3}} \cdot \frac{I_{dc}}{3} \angle -140°$$

Figure 6:
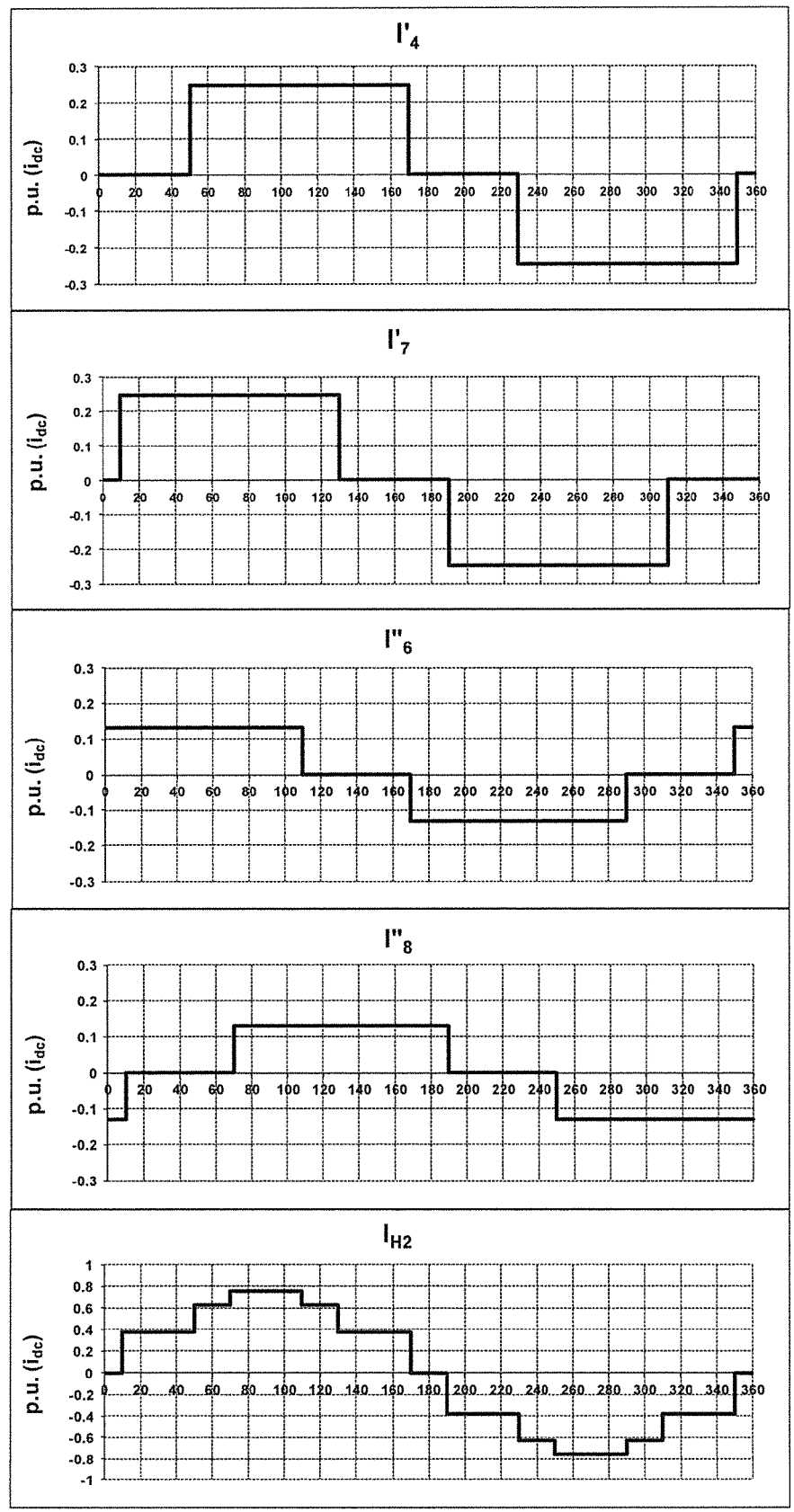
FIG. 6 is a series of curves that graphically illustrate the currents in the components that form the primary side input current, $I_{H2}$.
Figure 7:
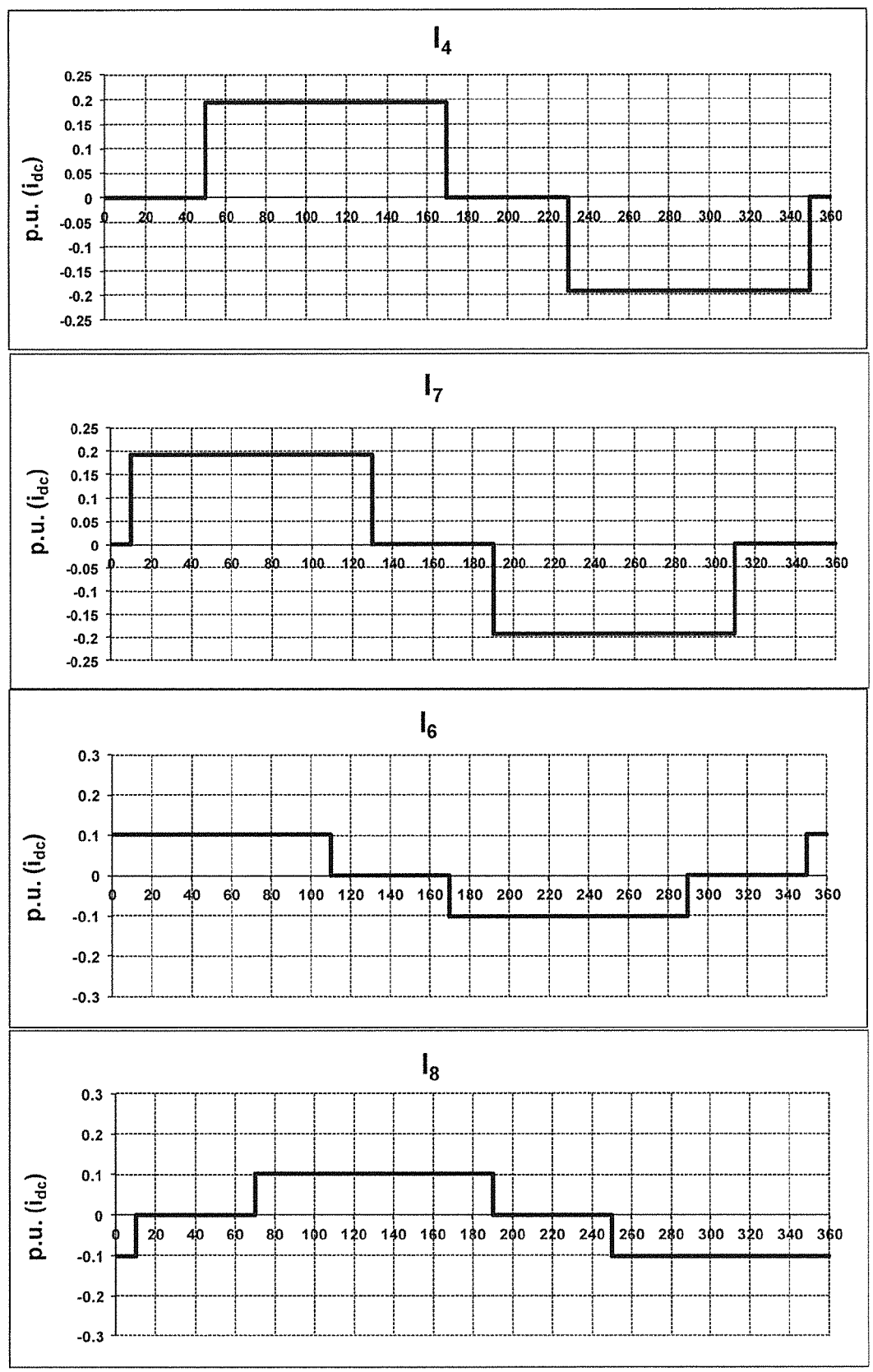
FIG. 7 is a series of curves that graphically illustrate the currents flowing in the polygon secondary that are responsible for the primary current component depicted in FIG. 6.

The current wave shape of $I_{H2}$ and the relative positions of the components of $I_{H2}$ are shown in FIG. 6.

Figure 8:
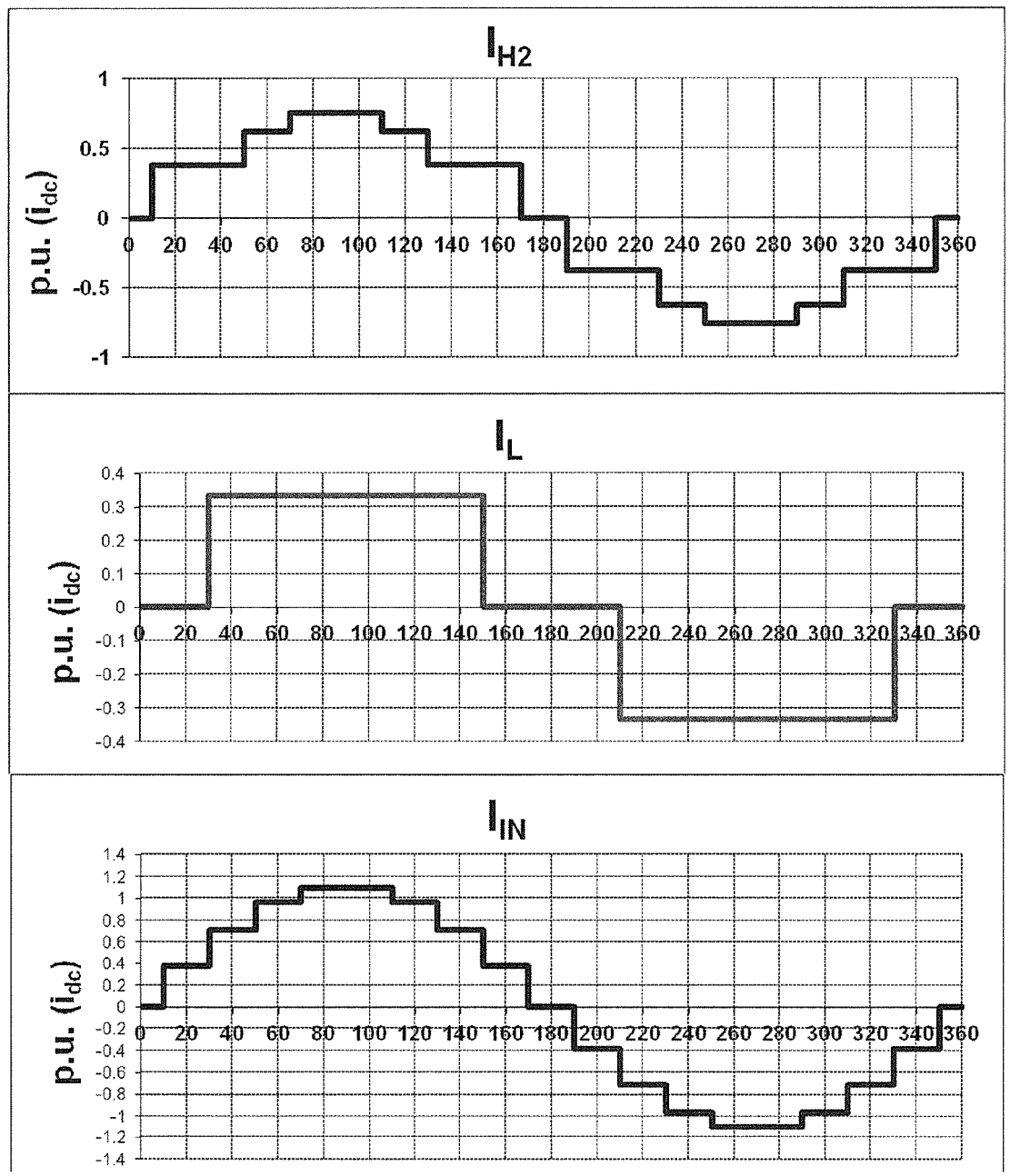
FIG. 8 is a series of curves that graphically illustrate the current $I_{IN}$ being composed of matching inductor current, $I_L$ and the primary input current, $I_{H2}$.

The input current $I_{in}$ drawn from the AC source 30 is a combination of the input current $I_{H2}$ into the transformer 14 and the current $I_L$ flowing through the matching inductor, $L_{matching}$, directly into the third bridge rectifier 40. A graphic illustration of the formation of $I_{in}$ is shown in FIG. 8. The waveform corresponding to $I_{in}$ in FIG. 8 is used to mathematically estimate the total input current harmonic distortion.

The staircase waveform shown in FIG. 8 for $I_{in}$ is analyzed using Fourier series. The analysis yields the theoretical value of the total input current harmonic distortion. The Fourier analysis is presented below:

$$I_{in} = I_0 + \sum_{n=1}^{n=\infty} a_n \cdot \cos(n\theta) + \sum_{n=1}^{n=\infty} b_n \cdot \sin(n\theta) \quad (4)$$

$$I_0 = \frac{1}{2 \cdot \pi} \cdot \int_0^{2\pi} I_{in} \cdot d\theta;$$

$$a_n = \frac{2}{\pi} \cdot \int_0^{\pi} I_{in} \cdot \cos(n\theta) \cdot d\theta;$$

$$b_n = \frac{2}{\pi} \cdot \int_0^{\pi} I_{in} \cdot \sin(n\theta) \cdot d\theta$$

On inspecting the waveform shown in FIG. 8, various observations are made. The waveform of $I_{in}$ does not have any DC component. This means that the DC component representation ($I_0$) in equation 4 is zero. $I_{in}$ is symmetrical about the x-axis. This means that there are no even harmonics. $I_{in}$ exhibits mirrored symmetry about the π axis. This means that $I_{in}$ is an odd function and not an even function. In other words, this property would render the coefficient $a_n$ to be zero. From observations mentioned above, only the coefficient $b_n$ needs to be computed.

Based on the observations made above, the coefficient $b_n$ is computed.

$$b_n = \frac{2}{\pi} \cdot \int_0^{\pi} I_{in} \cdot \sin(n\theta) \cdot d\theta = \quad (5)$$

$$\frac{2 \cdot I_{DC}}{\pi} \cdot \left\{ \int_{\pi/18}^{\pi/6} 0.379 \cdot \sin(n\theta) \cdot d\theta + \int_{\pi/6}^{5\pi/18} 0.712 \cdot \sin(n\theta) \cdot d\theta + \right.$$

$$\int_{5\pi/18}^{7\pi/18} 0.959 \cdot \sin(n\theta) \cdot d\theta + \int_{7\pi/18}^{11\pi/18} 1.091 \cdot \sin(n\theta) \cdot d\theta +$$

-continued $$b_n = \frac{2 \cdot I_{DC}}{n \cdot \pi} \cdot \sin(n\pi/2) \cdot \left\{ \begin{array}{l} \int_{11\pi/18}^{13\pi/18} 0.959 \cdot \sin(n\theta) \cdot d\theta + \int_{13\pi/18}^{5\pi/6} 0.712 \cdot \sin(n\theta) \cdot d\theta + \\ \int_{5\pi/6}^{17\pi/18} 0.379 \cdot \sin(n\theta) \cdot d\theta \end{array} \right\}$$

$$b_n = \frac{2 \cdot I_{DC}}{n \cdot \pi} \cdot \sin(n\pi/2) \cdot \left\{ \begin{array}{l} 0.666 \cdot \sin(n\pi/3) + 0.494 \cdot \sin(2n\pi/9) + \\ 0.758 \cdot \sin(4n\pi/9) + 0.264 \cdot \sin(n\pi/9) \end{array} \right\}$$

From equation (5), the following observations can be made. The total current harmonic distortion is computed to be 8.8% for the assumed staircase waveform. There does not exist any triplen harmonics. The first set of lowest order harmonics encountered is the 17th and the 19th. The 17th is observed to be of negative sequence, while the 19th is seen to be of positive sequence.

From the waveform for the primary side input current $I_x$ of the transformer configuration, the VA rating of the transformer is computed.

$$I_{H2} = \sqrt{\frac{1}{\pi} \cdot \left\{ \int_0^\pi (i_4'' + i_7'' + i_6'' + i_8'')^2 \cdot d\theta \right\}} \quad (6)$$

$$I_{H2} = \sqrt{\frac{I_{DC}^2}{\pi} \cdot \left\{ \begin{array}{l} \int_{\pi/18}^{5\pi/18} 0.379^2 \cdot d\theta + \int_{5\pi/18}^{7\pi/18} 0.626^2 \cdot d\theta + \int_{7\pi/18}^{11\pi/18} 0.758^2 \cdot d\theta + \\ \int_{11\pi/18}^{13\pi/18} 0.626^2 \cdot d\theta + \int_{13\pi/18}^{17\pi/18} 0.379^2 \cdot d\theta \end{array} \right\}}$$

$$I_{H2} = \sqrt{\frac{4 \cdot I_{DC}^2}{18} \cdot \{0.626^2 + 0.758^2 + (2 + 0.379^2)\}}$$

$$I_{H2} = 0.5278 \cdot I_{DC}$$

The VA rating of the phase-shifting isolation transformer 14 is computed by multiplying the RMS value of the input current with the RMS value of the applied voltage and further multiplying the result with three to account for all the windings.

$$VA_{xfmr} = 3 \cdot V_{LN} \cdot I_{H2} \quad (7)$$
$$= 3 \cdot V_{LN} \cdot 0.5278 \cdot I_{DC}$$
$$= 1.5834 \cdot V_{LN} \cdot I_{DC}$$

$$P_{out} = \frac{3 \cdot \sqrt{3} \cdot \sqrt{2} \cdot V_{LN}}{\pi} \cdot I_{DC}$$

$$\frac{VA_{xfmr}}{P_{out}} = \frac{1.5834 \cdot \pi}{3 \cdot \sqrt{6}}$$
$$= 0.677$$

From equation (7), it is seen that the transformer 14 processes about ⅔rd the rated output power. This conclusion matches the physical reasoning because the power processed by the non-phase shifted section that consists of the matching inductance $L_{matching}$, is about ⅓rd the rated output power.

There are salient differences between the prior art autotransformer systems and the AC/DC converter system 10 in accordance with the invention using the isolation transformer 14. These differences include that in autotransformer systems, the harmonic cancellation is primarily due to the reflected current waveform on to the branch carrying the main phase current. Due to non-ideal coupling and leakage effects, the cancellation is not complete and so the harmonic performance is not close to theoretical levels. In the described AC/DC converter system 10, the harmonic cancellation is not dependent on the idealness of the magnetic coupling. It is achieved by current combination at the input junction point between $I_{H2}$ and $I_L$ in FIG. 4.

As mentioned earlier, the imbalanced nature of the core also contributes to imperfect harmonic cancellation in existing autotransformer topologies. The problem of imbalanced flux in the magnetic circuit is resolved by the use of the symmetrical core transformer structure. The results clearly show that in order to achieve satisfactory harmonic distortion levels of less than 8%, no additional front end inductors are required. Only a small inductor of about 0.02 pu is required if the current distortion level of less than 5% is desired. Clearly, the use of symmetrical core transformer structure in combination with the current cancelling method described herein is solely responsible for such observed superior harmonic performance indices.

The sudden change in current associated with autotransformers is reflected on the input lines because of the fundamental fact that the leakage inductance in autotransformers is small. The input current also shows sharp edges with quick transitions. Such abnormalities deteriorate the harmonic performance and so there is inherently a need to use significant input impedance to smooth the current waveform and reduce the overall input current distortion. Hence, all autotransformer configurations employ input inductance in the range of 0.075 pu to 0.09 pu. This adds cost and increases the overall size significantly. Input inductors are associated with voltage drop and need to be compensated elsewhere. In contrast, due to the different way in which harmonic cancellation is achieved in the described AC/DC converter system 10, the reliance on an external inductor to achieve good performance is minimal. Typical values needed for the AC/DC converter system 10 range from 0.015 pu to 0.02 pu to meet 5% THID requirements and no external inductor when 8% or higher THID is required to be met. This results in a more compact, less expensive, more efficient system. Autotransformer systems rely heavily on stub windings. Stub windings are difficult to be practically implemented resulting in wastage of copper and poor utilization of the core. Manufacturing time is also longer due to the many complicated interconnections that need to be performed. In contrast, the AC/DC converter system 10 relies on standard isolation transformer techniques and is easy to manufacture with very few windings. Core and copper utilization is better, resulting in a more efficient and less expensive product.

Autotransformer topologies that convert a 3-phase system to a 9-phase output create an aberration in the DC bus ripple content of a VFD. When one or two of nine output phases has a bad diode, the increase in DC bus ripple is hardly noticeable and this reduces the chance for detection of failure. The power flow is now shared by the remaining diodes that can eventually fail. In contrast, in the AC/DC converter system 10, the DC bus ripple still corresponds to a typical three-phase, eighteen-pulse system and a failure in any one of the rectifier diodes is easily detected thereby enabling the protection circuit and shutting off the VFD. This results in a much safer operation.

An important deficiency observed in all 3-phase to 9-phase autotransformer schemes is the sudden change in current from one conducting pair to the other every 40 electrical degrees. The situation is amplified since most autotransformers do not have enough leakage inductance to slow the transition resulting in high di/dt across the rectifier diodes. Statistical records have shown that standard rectifier grade diodes are vulnerable to premature failure. In contrast, with the AC/DC converter system 10, the transition is observed to be much slower and corresponds to a typical rectifier with much lower values of di/dt. This results in less stress to the rectifier diodes and improves the mean time between failures (MTBF).

Thus the AC/DC converter system 10 in accordance with the invention uses a topology that is easy to manufacture, less complicated, and provides superior performance. It has good copper and core utilization and hence is less expensive. The problem of imbalanced flux in the magnetic circuit is resolved here by the use of the symmetrical core structure. The results clearly show that in order to achieve satisfactory harmonic distortion levels of less than 8%, no additional front end inductors are required. Only a small inductor of about 0.02 pu is required if the current distortion level of less than 5% is desired. Clearly, the use of symmetrical core structure in combination with the current cancelling method being proposed here is solely responsible for such observed superior harmonic performance indices.

In the eighteen-pulse topology discussed above, a matching inductor $L_{matching}$ is used in parallel with a three winding isolation transformer 14. The two sets of secondary windings 34 and 36 are phase shifted with respect to the primary winding 22 by +20 degrees and −20 degrees, respectively. By allowing flow of current through the matching inductor $L_{matching}$, without any phase shift, results in three distinct current vectors that are at 0-degrees, +20-degrees, and −20-degrees with respect to the input AC supply. For good harmonic cancellation, the RMS value of the current as well as the wave shape in the three sets should be as closely matched as possible. This improves harmonic cancellation.

The three phase inductor $L_{matching}$ is matched to the windings of the isolation transformer 14 to balance current flowing into the first, second and third three-phase six-pulse rectifiers 38-40. The RMS value of the currents flowing into the three six-pulse rectifiers 38-40 are the same, resulting from the fact that the wave shape and duration of conduction of corresponding diode pairs in each of the three six-pulse rectifiers are the same.

There are two aspects of the current waveform, both of which need to be matched to achieve optimal harmonic performance. They are the shape of the current waveform, and the RMS value of current. The shape of the current waveform flowing through the secondary windings and of the isolation transformer is matched to that flowing though the non-phase shifted route by manipulating the inductance of the inductor chosen in this path. The inductor thus facilitates only one aspect of the matching that is required for optimal harmonic performance. The second aspect of the matching deals with the RMS value of the current flowing through the phase shifted secondary windings and through the non phase shifted route. In order to achieve optimal harmonic performance, the RMS value balance is desired to be achieved at the rated operating condition, since at this condition the harmonic content in the input current is the highest. To achieve this, in accordance with another aspect of the invention, either the primary or both the secondary windings of the isolation transformer are provided with voltage taps. Once a particular tap position is chosen, it is typically fixed and the resulting secondary voltage is higher than the primary voltage, irrespective of the operating load condition. As the load on the rectifier increases, the voltage drop across the isolation transformer increases and the voltage tap then compensates for this voltage drop. By appropriately selecting the tap value, the voltage drop across the transformer can be effectively compensated. The tap value depends on the voltage drop across the transformer, which in turn depends on the leakage impedance of the transformer. By knowing the latter, correct tap positions can be predetermined during the construction phase of the isolation transformer.

In summary, shape matching is provided by the inductance of the inductor in the non phase shifted path, while the amplitude matching is provided by the taps in the isolation transformer. The taps can either be placed on the primary side, which is a less expensive option, or can be placed in each of the isolated secondary windings. Providing taps on the secondary windings can assist in controlling the individual secondary voltages independently, which in some cases may provide more flexibility and better control of the RMS value of current through those windings.

In one aspect of the invention, the taps are positioned so that voltage level is translated to a higher voltage by equal amounts. In accordance with an illustrated embodiment of the invention the amount is in a range of between about 2.0% and 4%. Particularly, taps can be from −2% to +2%. As is apparent, different levels could also be used.

Shape matching by the use of inductor in the non-phase shifted path is discussed next.

The current flowing through the isolation transformer feeding an AC to DC rectifier with a large DC link capacitor is wave shaped by the leakage inductance of the transformer. Unfortunately, the leakage inductance of the transformer is a function of the current flowing through the transformer and hence is not of a fixed value. Most transformer manufacturer's refer to a term called Impedance or "Z" of the transformer and provide the end user an estimated (not measured, but calculated) value of the leakage impedance that the transformer will offer under rated current condition at a specified operating temperature. In order to assure that the current flowing through one of the secondary windings of the isolation transformer matches in shape and duration to the current flowing through the matching inductor $L_{matching}$, see FIG. 9, the impedance offered by the matching inductor should match the impedance offered to current through one of the secondary windings. This task is not easy because the matching inductor has fixed inductance value, while the leakage inductance offered by the transformer for the current flowing through one of its secondary windings is load dependent. Hence, it is important to determine the operating point where best matching is desired to achieve optimal performance. Generally, this point is at the rated operating condition.

Amplitude matching among the phase shifted and non-phase shifted current paths is addressed next.

Figure 9:
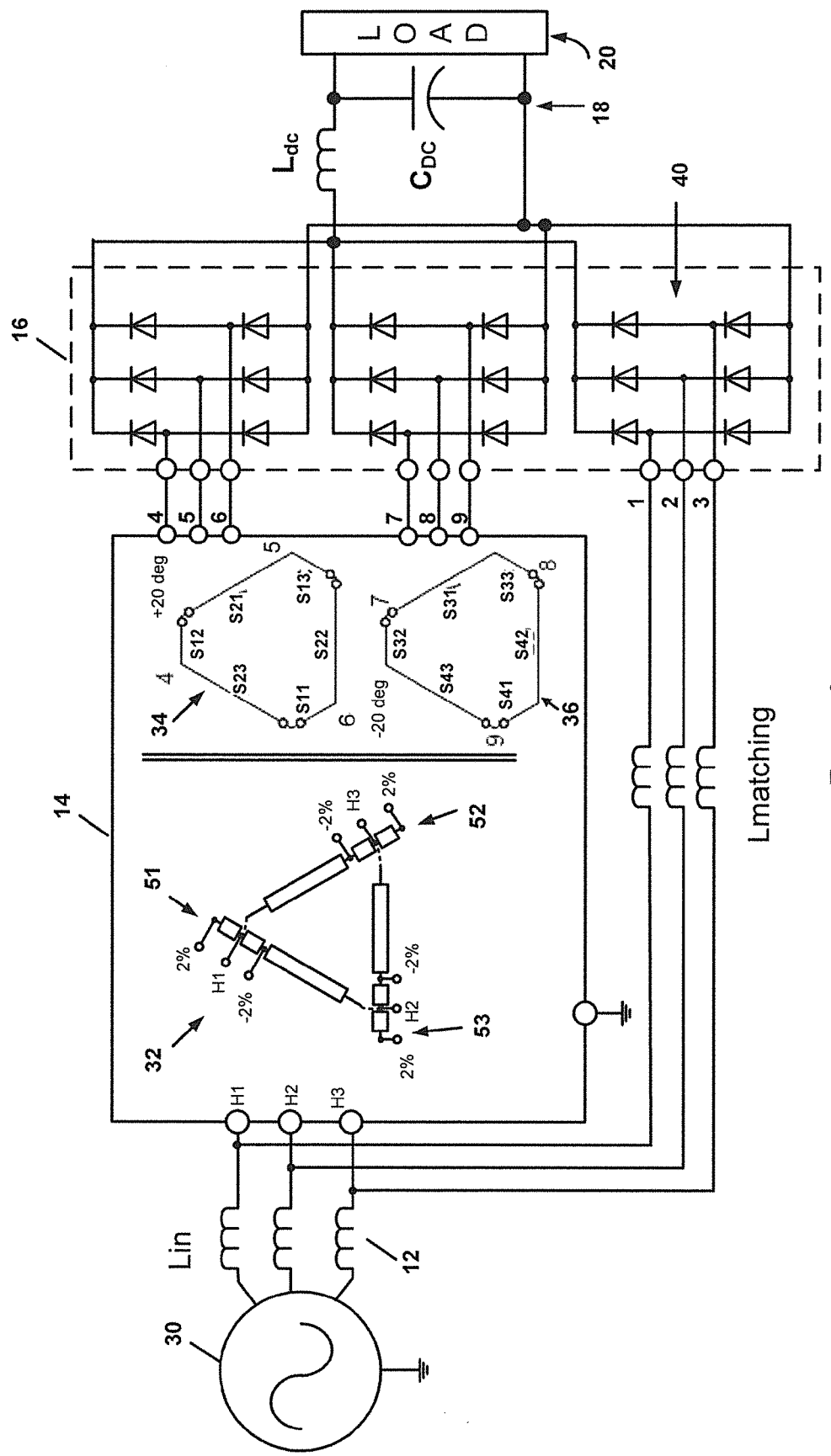
FIG. 9 is a schematic of a hybrid eighteen-pulse system with a balancing inductor and two sets of taps in the primary winding.
Figure 10:
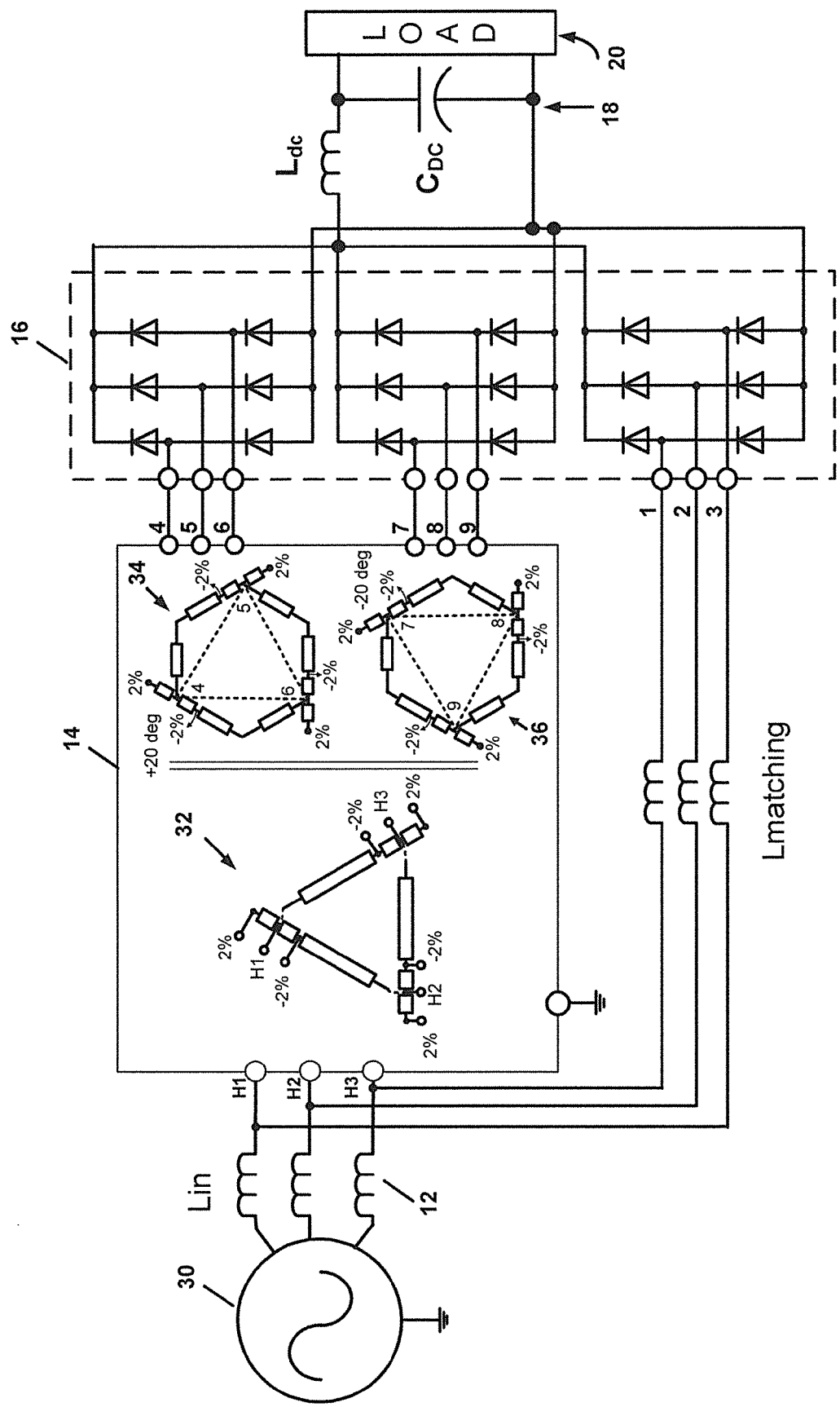
FIG. 10 is a schematic of a hybrid eighteen-pulse system with a balancing inductor and independent taps in secondary windings.

As mentioned earlier, when current flows through the phase shifting isolation transformer 14 shown in FIG. 9, there is a voltage drop, which is load dependent. The RMS value of the current through the secondary windings should closely match the RMS value of the current through the matching inductor, $L_{matching}$. The point at which this matching is desired is typically chosen to be the rated operating point. By introducing taps 51, 52, 53 in the primary winding 32 of the isolation transformer, as shown in FIG. 9, it is possible to increase the secondary voltage, which in turn can compensate for the voltage drop caused by current flowing through the transformer at rated load condition. If the windings in the secondary are well balanced between themselves, only one set of primary taps is sufficient to compensate for the voltage drop caused by the transformer. However, if there is a possibility that the secondary windings are not closely balanced, it is prudent to use independent set of taps in the secondary windings as shown in FIG. 10.

Polygon types of isolation transformer as shown have better copper and core utilization factor and results in a compact size and lower cost transformer for a given VA rating. The desired power rating of the isolation transformer in the disclosed topology is only 67% of the full power rating of the AC to DC rectifier system.

In yet another embodiment of the invention, the primary set of taps can also be used in a manner to afford more flexibility. By setting the primary connection points, H1~H3 to be at −2.0%, the secondary voltages will be boosted up to compensate for the drop in the voltage across the transformer as discussed per FIG. 9. Instead of supplying the balancing inductors from the connection points H1~H3 as shown in FIG. 9, they could be supplied from the +2.0% tap to boost up the non phase shifted part as well if it is desired. In some cases, such an arrangement has led to a better optimization. The scheme just described is shown in FIG. 11.

FIG. 9 illustrates an AC/DC converter system 10 comprising an input circuit 12 comprising a three phase inductor $I_{in}$ for connection to a three phase AC source 30. An isolation transformer 14 comprises a set of primary windings 32 and first and second sets 34, 36 of secondary windings magnetically coupled to the set of primary windings 32. The first and second sets 34, 36 of secondary windings are level translated to a higher voltage by an amount of about 2.0% from the set of primary windings 32 by providing taps 51-53 located at about −2.0% in the primary winding. The set of primary windings 32 is connected to the input circuit 12.

FIG. 10 illustrates an AC/DC converter system 10 which differs from that in FIG. 4 by providing independent taps in the secondary windings 34 and 36 at +2% and −2%. This enables a secondary winding level to be translated to a higher voltage by an amount in the range of about 2% to 4% from the set of primary windings.

Figure 11:
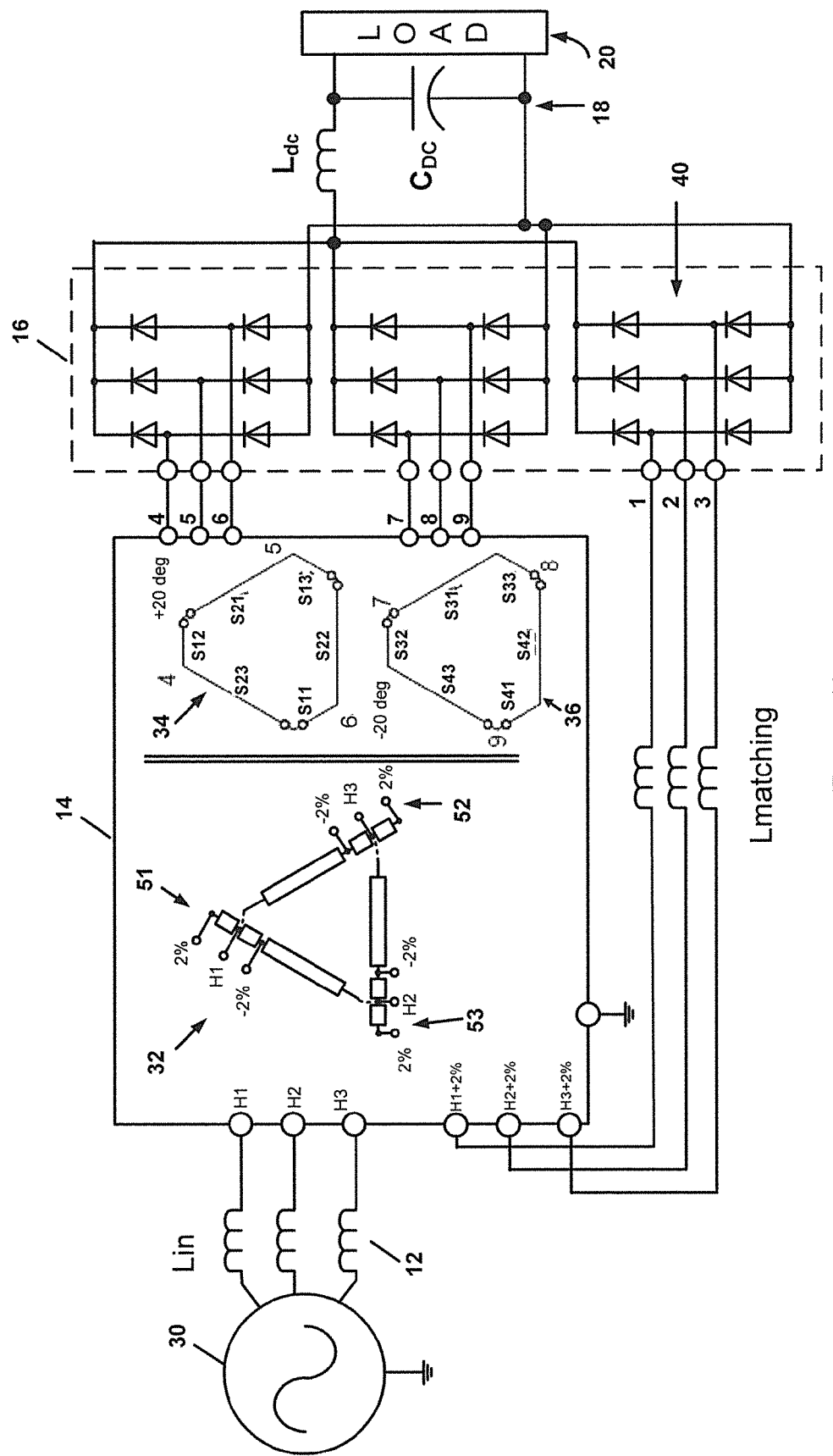
FIG. 11 is a schematic of a hybrid eighteen-pulse system supplying the balancing inductor from +2% taps on the primary side.

FIG. 11 illustrates a variation on the AC/DC converter system 10 of FIG. 9 wherein the matching inductor $L_{matching}$ is connected between a primary winding tap 51-53 and the nodes 1-3 of the third rectifier 40.

Thus, in accordance with the invention, an eighteen post rectifier in an AC/DC converter system uses a three phase isolation transformer having balanced flux in all three phases with two sets of secondary windings.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible.

The invention claimed is:

1. An AC/DC converter system comprising:
an input circuit for connection to a three-phase AC source;
an isolation transformer comprising a symmetrical core with a set of primary windings and first and second sets of secondary windings wound on the symmetrical core providing balanced flux in all three phase and magnetically coupling the first and second sets of secondary windings to the set of primary windings, the first and second sets of secondary windings phase shifted by select amounts from the set of primary windings, the set of primary windings connected to the input circuit;
an AC/DC converter comprising first, second and third three-phase, six-pulse rectifiers, the first three-phase six-pulse rectifier being powered by the first set of secondary windings, the second three-phase six-pulse rectifier being powered by the second set of secondary windings, and the third three-phase six-pulse rectifier being powered by the input circuit;
a current balancing three-phase inductor electrically connected between the input circuit and the third three-phase six-pulse rectifier; and
an output circuit for connection between the AC/DC converter and a DC load.

2. The AC/DC converter system of claim 1 wherein the symmetrical core comprises three sections, each section having a coil of steel, and the three sections being arranged in a triangular configuration defining three limbs for carrying the set of primary windings and first and second sets of secondary windings.

3. The AC/DC converter system of claim 2 wherein each section has three coils of steel slightly offset relative to one another.

4. The AC/DC converter system of claim 3 wherein the three limbs have a hexagonal cross sectional.

5. The AC/DC converter system of claim 1 wherein the three-phase inductor is matched to the windings of the isolation transformer to balance current flowing into the first, second and third three-phase six-pulse rectifiers such that the rms value of the currents flowing into the three six-pulse rectifiers are the same, resulting from the wave-shape and duration of conduction of corresponding diode pairs in each of the three six-pulse rectifiers being the same.

6. The AC/DC converter system of claim 1 wherein the first and second sets of secondary windings are level translated to a higher voltage by equal amounts of about 2.0% from the set of primary windings by providing taps in the primary windings.

7. The AC/DC converter system of claim 1 wherein the first and second sets of secondary windings are level translated to a higher voltage by equal amounts of between about 2.0% from the set of primary windings by providing taps in the secondary windings.

8. The AC/DC converter system of claim 1 wherein the first and second sets of secondary windings are phase shifted by +20 electrical degrees and −20 electrical degrees, respectively, from the set of primary windings.

9. The AC/DC converter system of claim 1 wherein the input circuit comprises a three-phase inductor.

10. The AC/DC converter system of claim 1 wherein the output circuit comprises parallel connected DC outputs from the six-pulse rectifiers connected through an output inductor to the DC load.

11. The AC/DC converter system of claim 1 wherein the set of primary windings are wound in a delta configuration.

12. The AC/DC converter system of claim 1 wherein the first and second sets of secondary windings are wound in a polygon configuration.

13. An AC/DC converter system comprising:
an input circuit comprising a three-phase inductor for connection to a three-phase AC source;
a symmetrical core based balanced flux isolation transformer comprising a set of primary windings and first and second sets of secondary windings magnetically coupled to the set of primary windings, the first and second sets of secondary windings level translated to a higher voltage by an amount in the range of about 2.0% to 4% from the set of primary windings using independent taps in the secondary windings, the set of primary windings connected to the input circuit;

an AC/DC converter comprising first, second and third three-phase rectifiers each for converting AC power to DC power, each of the rectifiers comprising a six-pulse rectifier;

the first three-phase rectifier being electrically connected to the first set of secondary windings;

the second three-phase rectifier being electrically connected to the second set of secondary windings;

an inductor electrically connected between the input circuit and the third three-phase rectifier, comprising a current balancing three-phase inductor matched to the windings of the balanced flux isolation transformer to balance current flowing into the first, second and third three-phase rectifiers; and an output circuit for connection between the AC/DC converter and a DC load.

14. The AC/DC converter system of claim 13 wherein the first and second sets of secondary windings are phase shifted by +20 electrical degrees and −20 electrical degrees, respectively, from the set of primary windings.

15. The AC/DC converter system of claim 13 wherein the output circuit comprises parallel connected DC outputs from the three-phase rectifiers connected through an output inductor to the DC load.

16. The AC/DC converter system of claim 13 wherein the set of primary windings are wound in a delta configuration.

17. An AC/DC converter system comprising:

an input circuit comprising a three-phase inductor for connection to a three-phase AC source;

a symmetrical core based balanced flux isolation transformer comprising a set of primary windings and first and second sets of secondary windings magnetically coupled to the set of primary windings, the first and second sets of secondary windings level translated to a higher voltage by an amount of about 2.0% from the set of primary windings by providing taps located at about −2.0% in the primary winding, the set of primary windings connected to the input circuit;

an AC/DC converter comprising first, second and third three-phase rectifiers each for converting AC power to DC power, each of the rectifiers comprising a six-pulse rectifier;

the first three-phase rectifier being electrically connected to the first set of secondary windings;

the second three-phase rectifier being electrically connected to the second set of secondary windings;

an inductor electrically connected between a primary winding tap of about +2.0% and the third three-phase rectifier, comprising a current balancing three-phase inductor matched to the windings of the isolation transformer to balance amplitude of current flowing into the first, second and third three-phase rectifiers; and an output circuit for connection between the AC/DC converter and a DC load.

18. The AC/DC converter system of claim 17 wherein the first and second sets of secondary windings are phase shifted by +20 electrical degrees and −20 electrical degrees, respectively, from the set of primary windings.

19. The AC/DC converter system of claim 17 wherein the output circuit comprises parallel connected DC outputs from the three-phase rectifiers connected through an output inductor to the DC load.

20. The AC/DC converter system of claim 17 wherein the set of primary windings are wound in a delta configuration.

\* \* \* \* \*